United States Patent [19]

Timberlake et al.

[11] 4,330,481

[45] May 18, 1982

[54] PROCESS FOR PREPARING POLYCARBONATES

[75] Inventors: John F. Timberlake; Daniel W. Baugh, Jr., both of Baton Rouge; Bobby Burkes, New Orleans, all of La.

[73] Assignee: The Dow Chemical Company, Midland, Mich.

[21] Appl. No.: 177,030

[22] Filed: Aug. 11, 1980

Related U.S. Application Data

[62] Division of Ser. No. 973,211, Dec. 26, 1978.

[51] Int. Cl.$^3$ .............................................. C07C 69/96
[52] U.S. Cl. ..................................... 260/463; 528/370
[58] Field of Search ......................... 260/463; 528/370

[56] References Cited

U.S. PATENT DOCUMENTS 3,689,462 9/1972 Maximovich ....................... 260/463
3,896,090 7/1975 Maximovich ....................... 260/463

FOREIGN PATENT DOCUMENTS 2712162 9/1978 Fed. Rep. of Germany ...... 260/463

Primary Examiner—Anton H. Sutto
Attorney, Agent, or Firm—A. J. Young

[57] ABSTRACT

Polycarbonate type nonionic surfactant compositions comprising monohydroxy alcohols capped with polycarbonate groups. More specifically, the surfactant compositions comprise aliphatic, nonaromatic cycloaliphatic or aromatic alcohols which have been capped with block polycarbonate groups formed by the reaction of the alcohols with ethylene carbonate in the presence of an alkali metal salt catalyst. The surfactant properties of the compositions may be varied by first reacting the alcohols with ethylene oxide to form a block polyether group cap on the alcohols before the reaction with ethylene carbonate or by further reacting the polycarbonate capped alcohols with ethylene oxide to form a terminal polyether block group. The surfactants formed are a random distribution mixture of compositions wherein 2 to 20 moles of ethylene carbonate and 3 to 50 moles of ethylene oxide per mole of the alcohols are reacted together.

10 Claims, No Drawings

PROCESS FOR PREPARING POLYCARBONATES

CROSS REFERENCE TO RELATED APPLICATION

This is a division, of application Ser. No. 973,211 filed Dec. 26, 1978.

BACKGROUND OF THE INVENTION (1) Field of the Invention

This invention relates to nonionic surfactants and methods for making the same, with particular reference to nonionic surfactant compositions comprising monohydroxy alcohols capped with a polycarbonate.

(2) Brief Description of the Prior Art

In many industrial and household cleaning applications it is desirable or necessary to use a surfactant in the cleaning formulations to achieve satisfactory wetting and cleansing. Furthermore, in many of these industrial and household applications it is necessary to maintain a low level of foam during the cleaning operation. For example, surfactants that produce excessive foaming may be unsuitable in an industrial spray metal cleaning operation or for use as an active ingredient in detergents and rinse aids for household mechanical dishwashers.

One type of nonionic surfactant known in the art is the fatty acid ester of an alcohol ethoxylate, which ester is produced by condensing ethylene oxide with a detergent range alcohol, and then reacting such ethoxylated alcohol with fatty acids containing from 8 to 18 carbon atoms, or with the chlorides of such acids. Surfactants produced in this manner are described in U.S. Pat. No. 1,970,578 which teaches such surfactants as having excellent wetting, foaming and cleansing properties. However, surfactants of this type would not be satisfactory for uses where the suppression of foam is important.

Another type of nonionic surfactant known in the art is described in U.S. Pat. No. 3,539,518 which teaches a low foam, nonionic surfactant composition consisting essentially of a straight chain acyl group of 1 to 5 carbon atoms capped on an alcohol ethoxylate. More specifically the low foam surfactant composition consists of an alkoxypolyethoxycarboxylate compound which is produced by condensing ethylene oxide on an alcohol having 4 to 20 carbon atoms using means well known to the art, and then reacting this ethoxylate with a straight chain alkanoic acid having 1 to 5 carbon atoms or with the acyl halide or the anhydride of such acid.

SUMMARY

In general, the present invention provides new low foam, nonionic, polycarbonate type surfactant compositions and methods for producing the same. More specifically, the surfactant compositions comprise compounds represented by the following structural formulas:

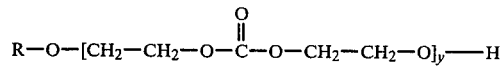

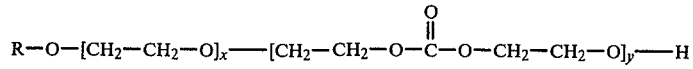

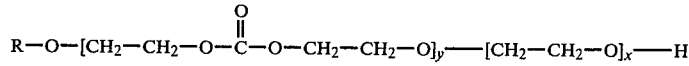

where R is an aliphatic, non-aromatic cycloaliphatic or aromatic group, y is a number from 1 to 10 and x is a number from 3 to 50.

In general, the process for producing the above surfactant compositions comprises reacting ethylene carbonate and a monohydroxy alcohol in the presence of an alkali metal salt catalyst at a temperature of about 130° C. to about 210° C. The monohydroxy alcohol may be capped with ethylene oxide before reacting it with ethylene carbonate or the reaction product of the ethylene carbonate/monohydroxy alcohol reaction may be further reacted with ethylene oxide to provide surfactants having different physical properties. The hydroxyethylation reaction of the alcohol or polycarbonate reaction product with ethylene oxide can be easily accomplished by using a basic catalyst, i.e. KOH, at a temperature of about 90° C. to about 120° C.

The reaction of the monohydroxy alcohol or ethoxylated alcohol with ethylene carbonate is represented by the following equations.

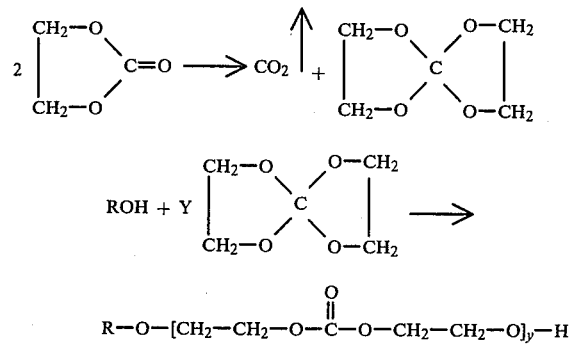

The above equations illustrate that 50% of the available $CO_2$ in the ethylene carbonate is lost as a result of the formation of the carbonate intermediate illustrated by the first equation. Thus, the theoretical maximum yield of the polycarbonate block portion in the surfactant compositions is only 50% of the $CO_2$ available in the original ethylene carbonate reactant. Moreover, it is believed that the ethylene carbonate/alcohol reaction is initiated by an ethoxy ether radical resulting from the decomposition of ethylene carbonate to ethylene oxide and $CO_2$. This ethoxy ether free radical initiation of the polycarbonate/alcohol reaction appears to be accurate since only about 38% to 43% of the $CO_2$ in the ethylene carbonate is normally retained as a carbonate radical in the final surfactant compositions.

Generally, about 2 to 20 moles, and more preferably about 3 to 10 moles, of ethylene carbonate per mole of monohydroxy alcohol or ethoxylated monohydroxy alcohol are reacted together to provide the hydrophobic properties in the final surfactant compositions. Also, about 3 to 50 moles, and preferably about 3 to 10 moles, of ethylene oxide per mole of monohydroxy alcohol or polycarbonate capped monohydroxy alcohol are reacted together to provide the hydrophilic properties in the final surfactant compositions.

The temperature of the ethylene carbonate/alcohol reaction is maintained between about 130° C. to about 210° C., and preferably between about 140° C. and about 170° C. A reaction temperature below 130° C. is not desirable since the formation of the polycarbonate block portion of the surfactant compositions is extremely slow at such low temperatures. Reaction temperatures above about 210° C. are also undesirable since ethylene carbonate will decompose into ethylene oxide and $CO_2$ at these elevated temperatures and the more reactive hydroxyethylation or polyether reactions will occur.

In order to form the polycarbonate block portion of the surfactant compositions, it is necessary that the ethylene carbonate/alcohol reaction be run in the presence of an alkali metal salt catalyst. Examples of useful alkali metal salt catalyst are sodium stannate, potassium stannate, sodium carbonate, potassium carbonate, sodium hydroxide, potassium hydroxide, the sodium alkoxide of the monohydroxy alcohol and the potassium alkoxide of the monohydroxy alcohol. Sodium stannate has been found to be a particularly effective catalyst since high yields and low reaction time were obtained when it was used.

In view of the preceding discussion, it will be appreciated that the polycarbonate type surfactant products produced by this invention have, in all probability, some random ether radicals disposed within the polycarbonate block portion of the products since the theoretical 50 percent $CO_2$ reaction in the products is normally not achieved during the ethylene carbonate/alcohol reaction. Furthermore, it will be appreciated that the surfactant products are not a single compound in each instance but are a mixture of compounds of different molecular weights characterized by an average molecular weight depending on the termination point of the ether and/or carbonate blocks in each molecule.

DESCRIPTION OF THE PREFERRED EMBODIMENTS

The following description illustrates the manner in which the principles of the invention are applied but are not to be construed as limiting the scope of the invention. The following examples demonstrate the preparation of the polycarbonate type surfactants in accordance with the present invention.

EXAMPLE 1

A stirred reaction mixture of 2640 grams (30 moles) of ethylene carbonate, 558 grams (3 moles) of n-dodecanol and 12.0 grams (0.056 moles) of sodium stannate was heated to 170° C. for 24 hours in a reaction vessel under a nitrogen atmosphere. The mixture was then cooled to 130° C. and 30 grams of finely divided magnesium silicate and 60 grams of celite clay were added to purify the mixture. The mixture was continuously stirred at 130° C. for an additional 21 hours. At this point, the reaction product mixture was permitted to cool and was then filtered to remove the magnesium silicate and celite clay. 2000 grams of a pale yellow, transparent, viscous liquid reaction product was obtained which retained about 40 weight percent of the available $CO_2$ in the ethylene carbonate as a carbonate radical in the reaction product as determined by nuclear magnetic resonance spectral analysis.

EXAMPLE 2

A stirred reaction mixture of 44 grams (0.5 moles) of ethylene carbonate, 18.4 grams (0.1 moles) of cyclododecanol and 0.2 grams (0.001 moles) of sodium stannate was heated to 170° C. for 22 hours in a reaction vessel under a nitrogen atmosphere. The mixture was then cooled to 130° C. and 0.5 grams of magnesium silicate and 1.0 grams of celite clay were added to purify the mixture. The mixture was continuously stirred at 130° C. for an additional one hour. The reaction product mixture was permitted to cool and was then filtered to remove the magnesium silicate and celite clay. 35.1 grams of a pale yellow, transparent, viscous liquid reaction product was obtained which solidified on standing. About 40 weight percent of the available $CO_2$ in the ethylene carbonate was retained as a carbonate radical in the product.

EXAMPLE 3

The reaction conditions of Examples 1 and 2 were duplicated except that a mixture of 44 grams (0.5 moles) of ethylene carbonate, 20 grams (0.091 moles) of 4-nonylphenol and 0.2 grams (0.001 moles) of sodium stannate was reacted at 170° C. for 18 hours. The temperature of the mixture was reduced to 130° C., 1 gram of magnesium silicate and 1 gram of celite clay were added to the mixture and stirring was continued for one hour before cooling and filtering the reaction product. About 33 weight percent of the available $CO_2$ in the ethylene carbonate was retained as a carbonate radical in the reaction product.

EXAMPLE 4

The reaction conditions of Examples 1 and 2 were again duplicated except that a mixture of 44 grams (0.5 moles) of ethylene carbonate, 4.7 grams (0.025 moles) of n-dodecanol and 0.5 grams (0.002 moles) of sodium stannate was reacted at 150° C. for 40 hours. 30.3 grams of a yellow, transparent, viscous liquid reaction product was obtained after purification and filtration as in Example 3. 41 weight percent of the available $CO_2$ was retained as a carbonate radical in the reaction product.

EXAMPLE 5

The reaction conditions of Examples 1 and 2 were again duplicated except that a mixture of 44 grams (0.5 moles) of ethylene carbonate, 5 grams (0.025 moles) of 2,4,6,8-tetramethyl-1-nonanol and 0.2 grams (0.001 moles) of sodium stannate was reacted at 150° C. for 20 hours. 26.4 grams of reaction product was obtained after purification and filtration as in Example 3. 40 weight percent of the available $CO_2$ was retained as a carbonate radical in the reaction product.

EXAMPLE 6

The reaction conditions of Examples 1 and 2 were again duplicated except that a mixture of 44 grams (0.5 moles) of ethylene carbonate, 6.3 grams (0.034 moles) of n-dodecanol and 0.01 grams (0.0001 moles) of potassium carbonate was reacted at 135° C. for 24 hours. The temperature of the mixture was then raised to 165° C. and reacted for an additional 44 hours. 26.9 grams of a dark brown, transparent, viscous liquid reaction product was obtained after purification and filtration as in Example 3. 19 weight percent of the available $CO_2$ was retained as a carbonate radical in the reaction product.

EXAMPLE 7

37.3 grams (0.2 moles) of n-dodecanol and about 0.05 grams (0.002 moles) of sodium metal were mixed in a reaction vessel at 100° C. until the sodium dissolved. 88.1 grams (1.0 moles) of ethylene carbonate was added to the reaction vessel and the stirred mixture was heated to 200° C. and maintained at that temperature for 2 hours. 83.2 grams of a pale yellow, transparent, viscous liquid reaction product was obtained after purification and filtration as in Example 3.

EXAMPLE 8

A stirred reaction mixture of 22 grams (0.25 moles) of ethylene carbonate, 16.6 grams (0.05 moles) of a mixture of n-dodecyl and n-tetradecyl triethoxylates (approximately 50/50 mole percent mixture) and 0.2 grams (0.001 moles) of sodium stannate was heated to 150° C. for 17 hours in a reaction vessel under a nitrogen atmosphere. 24.1 grams of a pale yellow, transparent, viscous liquid reaction product was obtained after purification and filtration as in Example 3.

EXAMPLE 9

A stirred reaction mixture of 44 grams (0.5 moles) of ethylene carbonate, 23.6 grams (0.05 moles) of a mixture of n-dodecyl and n-tetradecyl hexaethoxylates (approximately 50/50 mole percent) and 0.2 grams (0.001 moles) of sodium stannate was heated to 150° C. for 24 hours. 48.1 grams of a pale yellow, transparent, viscous liquid reaction product was obtained after purification and filtration as in Example 3.

EXAMPLE 10

27 grams (0.31 moles) of ethylene carbonate, 53.0 grams (0.10 moles) of 2,4,6,8 tetramethyl-1-nonyl octaethoxylate and 0.2 grams (0.001 moles) of sodium stannate were heated to 150° C. for 20 hours in a stirred reaction vessel as in Example 8. 64.2 grams of a pale yellow, transparent, viscous liquid reaction product was obtained after purification and filtration as in Example 3.

EXAMPLE 11

440 grams (5 moles) of ethylene carbonate, 530 grams (0.96 moles) of 2,4,6,8 tetramethyl-1-nonyl octaethoxylate and 2 grams (0.01 moles) of sodium stannate were heated to 160° C. for 24 hours in a stirred reaction vessel under a nitrogen atmosphere. The mixture was then cooled to 110° C., 10 grams of magnesium silicate and 10 grams of celite clay were added and the mixture was stirred for one hour. After filtration, 703 grams of a pale yellow, transparent, viscous liquid reaction product was obtained.

EXAMPLE 12

15.1 grams (0.17 moles) of ethylene carbonate, 17.1 grams (0.0087 moles) of tertrary octylphenol capped with 40 moles of ethylene oxide per mole of alcohol and 0.2 grams (0.001 moles) of sodium stannate were heated to 160° C. for 12 hours in a stirred reaction vessel as in Example 8. 10.7 grams of a tan solid reaction product was obtained after purification and filtration as in Example 3.

EXAMPLE 13

The reaction conditions of Example 5 were duplicated except that a mixture of 44 grams (0.5 moles) of ethylene carbonate, 20 grams (0.1 moles) of 2,4,6,8-tetramethyl-1-nonanol and 0.2 grams (0.001 moles) of sodium stannate was reacted at 150° C. for 20 hours. The reaction product was purified and filtered as in Example 3. 20 grams (0.038 moles) of this reaction product and 0.1 grams (0.0018 moles) of potassium hydroxide were placed in a reaction vessel and heated to 110° C. 7.5 grams (0.17 moles) of ethylene oxide were then added to the reaction vessel and the mixture was continuously stirred for 16 hours. 23.5 grams of a pale yellow, transparent, viscous liquid reaction product were obtained after purification and filtration as in Example 3.

EXAMPLE 14

The reaction conditions of Example 5 were again duplicated except that a mixture of 44 grams (0.5 moles) of ethylene carbonate, 10 grams (0.05 moles) of 2,4,6,8-tetramethyl-1-nonanol and 0.2 grams (0.001 moles) of sodium stannate was reacted at 150° C. for 20 hours. 20 grams (0.023 moles) of this reaction product, 5 grams (0.114 moles) of ethylene oxide and 0.1 grams (0.0018 moles) of potassium hydroxide were continuously stirred at 110° C. for 16 hours in a reaction vessel. 25.5 grams of a pale yellow, transparent, viscous liquid reaction product were obtained after purification and filtration as in Example 3.

The following Table 1 illustrates the mole ratios of ethylene carbonate and ethylene oxide reacted with each mole of alcohol and the catalyst used for the above examples.

TABLE 1

| Example | ROH[1] | Catalyst | Moles EO[2] | Moles EC[3] | Moles EO |
|---|---|---|---|---|---|
| 1 | $C_{12}OH$ | $Na_2SnO_3$ | — | 10 | — |
| 2 | Cyc . $C_{12}OH$ | $Na_2SnO_3$ | — | 5 | — |
| 3 | $C_9$-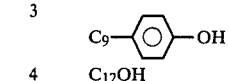-OH | $Na_2SnO_3$ | — | 5.5 | — |
| 4 | $C_{12}OH$ | $Na_2SnO_3$ | — | 20 | — |
| 5 | $C_{13}OH$ | $Na_2SnO_3$ | — | 20 | — |
| 6 | $C_{12}OH$ | $K_2CO_3$ | — | 14.7 | — |
| 7 | $C_{12}OH$ | Na | — | 5 | — |
| 8 | $C_{12}/C_{14}$—OH | $Na_2SnO_3$ | 3 | 5 | — |
| 9 | $C_{12}/C_{14}$—OH | $Na_2SnO_3$ | 6 | 10 | — |
| 10 | $C_{13}OH$ | $Na_2SnO_3$ | 8 | 3 | — |
| 11 | $C_{13}OH$ | $Na_2SnO_3$ | 8 | 5 | — |
| 12 | $C_8$-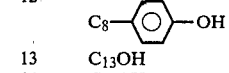-OH | $Na_2SnO_3$ | 40 | 20 | — |
| 13 | $C_{13}OH$ | KOH | — | 5 | 4.5 |
| 14 | $C_{13}OH$ | KOH | — | 10 | 4.9 |

1 - Monohydroxy Alcohol
2 - Ethylene Oxide
3 - Ethylene Carbonate

The following Table 2 illustrates the surfactant properties for the reaction products of the above examples.

TABLE 2

| Example[1] | Surface Tension[2] dynes/cm | Interfacial Tension[3] dynes/cm | Foam Height Cms[4] Initial | Foam Height Cms[4] Final | Wetting Time[5] secs | Cloud Pt.[6] °C. |
|---|---|---|---|---|---|---|
| 1 | 28.2 | 1.3 | 1.5 | 0.5 | >300 | <25 |
| 2 | 37.4 | 1.0 | 0.5 | 0.2 | >300 | <25 |
| 3 | 31.3 | 9.4 | 0.8 | 0.7 | >300 | Insoluble |
| 4 | 31.8 | 1.3 | *5.5 | *3.0 | *120 | <25 |
| 5 | 32.7 | 1.6 | *4.6 | *0.8 | >300 | <25 |

TABLE 2-continued

| Example[1] | Surface Tension[2] dynes/cm | Interfacial Tension[3] dynes/cm | Foam Height-Cms[4] Initial | Foam Height-Cms[4] Final | Wetting Time[5] secs | Cloud Pt.[6] °C. |
|---|---|---|---|---|---|---|
| 6 | 33.3 | 5.8 | 19.6 | 8.9 | 75 | <25 |
| 7 | 28.8 | 1.0 | 5.6 | 1.8 | 85 | <25 |
| 8 | 31.7 | 2.2 | 23.0 | 6.6 | 45 | 35 |
| 9 | 29.8 | 1.8 | 6.1 | 2.3 | 61 | — |
| 10 | 27.5 | 1.1 | 8.6 | 3.8 | 36 | 18 |
| 11 | 26.8 | 1.7 | 6.0 | 1.6 | 40 | 24 |
| 12 | 34.3 | 8.9 | 26.9 | 12.2 | >300 | — |
| 13 | 26.8 | 2.4 | 7.6 | 3.3 | 81 | <5 |
| 14 | 29.6 | 1.2 | 8.4 | 3.8 | 66 | <5 |

[1]0.1 weight percent concentration in deionized water. Numbers marked with * are 1.0 weight percent concentration in deionized water.
[2]ASTM D-1331 test procedure.
[3]ASTM D-1331 test procedure.
[4]Foam height was determined using the Hamilton Blender (Model No. 636-3) Foam Test. 250 ml. of a 0.1% by weight surfactant/water solution was whipped at low speed for one minute. The solution and foam were poured into a standard 500 ml. graduated cylinder having a 4.7 centimeter diameter. The foam height was measured immediately and after five minutes.
[5]The Syndrome Tape Modification of the Draves-Clarkson wetting test using a nine-inch strip of unmercerized natural cotton cloth tape attached to a one gram hook which in turn is attached to a forty gram weight by thread was used to determine wetting time. The solution concentration was 0.1% by weight surfactant in deionized water. The arrangement was dropped into a 500 ml. of the surfactant solution. When the tape was wetted, it dropped to the bottom of the graduated cylinder indicating the wetting time.
[6]ASTM D2024 test procedure except 0.1% concentration used in place of 1.0% concentration.

While certain representative embodiments have been shown in detail for the purpose of illustrating the invention, it will be apparent to those skilled in the art that various changes and modifications can be made without departing from the spirit and scope of the invention.

What is claimed is:

1. A process for the preparation of polycarbonate type surfactants comprising reacting ethylene carbonate and a monohydroxy alcohol in the presence of an alkali metal salt catalyst at a temperature of about 130° C. to about 210° C.

2. The process of claim 1 wherein about 2 to 20 moles of ethylene carbonate per mole of said monohydroxy alcohol are reacted together.

3. The process of claim 2 wherein about 3 to 10 moles of ethylene carbonate per mole of said monohydroxy alcohol are reacted together.

4. The process of claim 1 wherein said alkali metal salt is sodium stannate, potassium stannate, sodium carbonate, potassium carbonate, sodium hydroxide, potassium hydroxide, the sodium alkoxide of said monohydroxy alcohol or the potassium alkoxide of said monohydroxy alcohol.

5. The process of claim 1 wherein said monohydroxy alcohol has the formula:

$$R-O-[CH_2-CH_2-O]_x-H$$

wherein R is an aliphatic, non-aromatic cycloaliphatic or aromatic group and x is a number from 3 to 50.

6. The process of claim 5 wherein about 2 to 20 moles of ethylene carbonate per mole of said monohydroxy alcohol are reacted together.

7. The process of claim 6 wherein about 3 to 10 moles of ethylene carbonate per mole of said monohydroxy alcohol are reacted together.

8. The process of claim 5 wherein x is a number from 3 to 10.

9. The process of claim 8 wherein about 2 to 20 moles of ethylene carbonate per mole of said monohydroxy alcohol are reacted together.

10. The process of claim 9 wherein about 3 to 10 moles of ethylene carbonate per mole of said monohydroxy alcohol are reacted together.

* * * * *